Dec. 28, 1943. N. A. CHRISTENSEN 2,337,738
DOUBLE ACTING SHOCK BRAKE
Filed Oct. 3, 1939 3 Sheets-Sheet 1
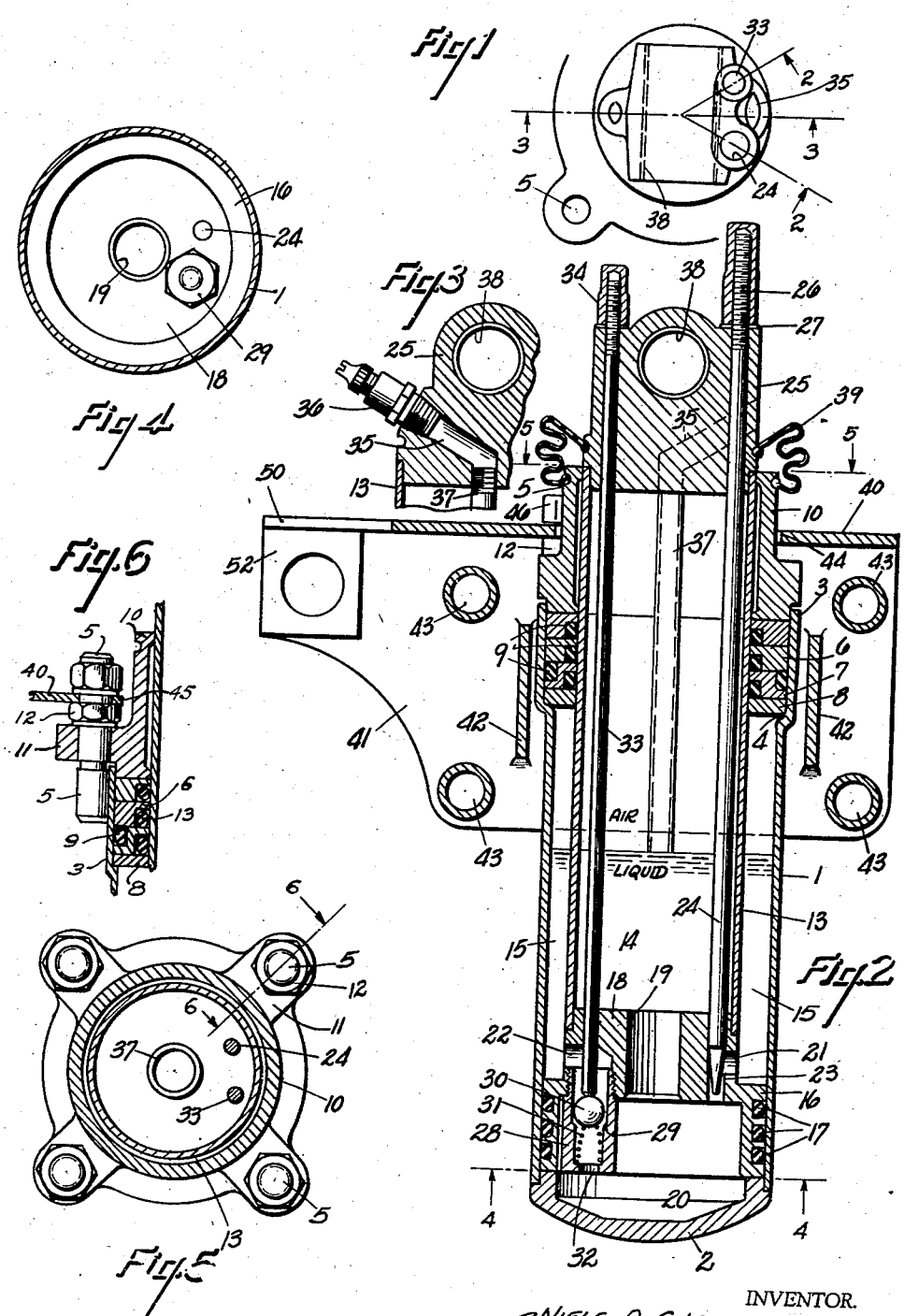
INVENTOR.
NIELS A. CHRISTENSEN
ATTORNEY.

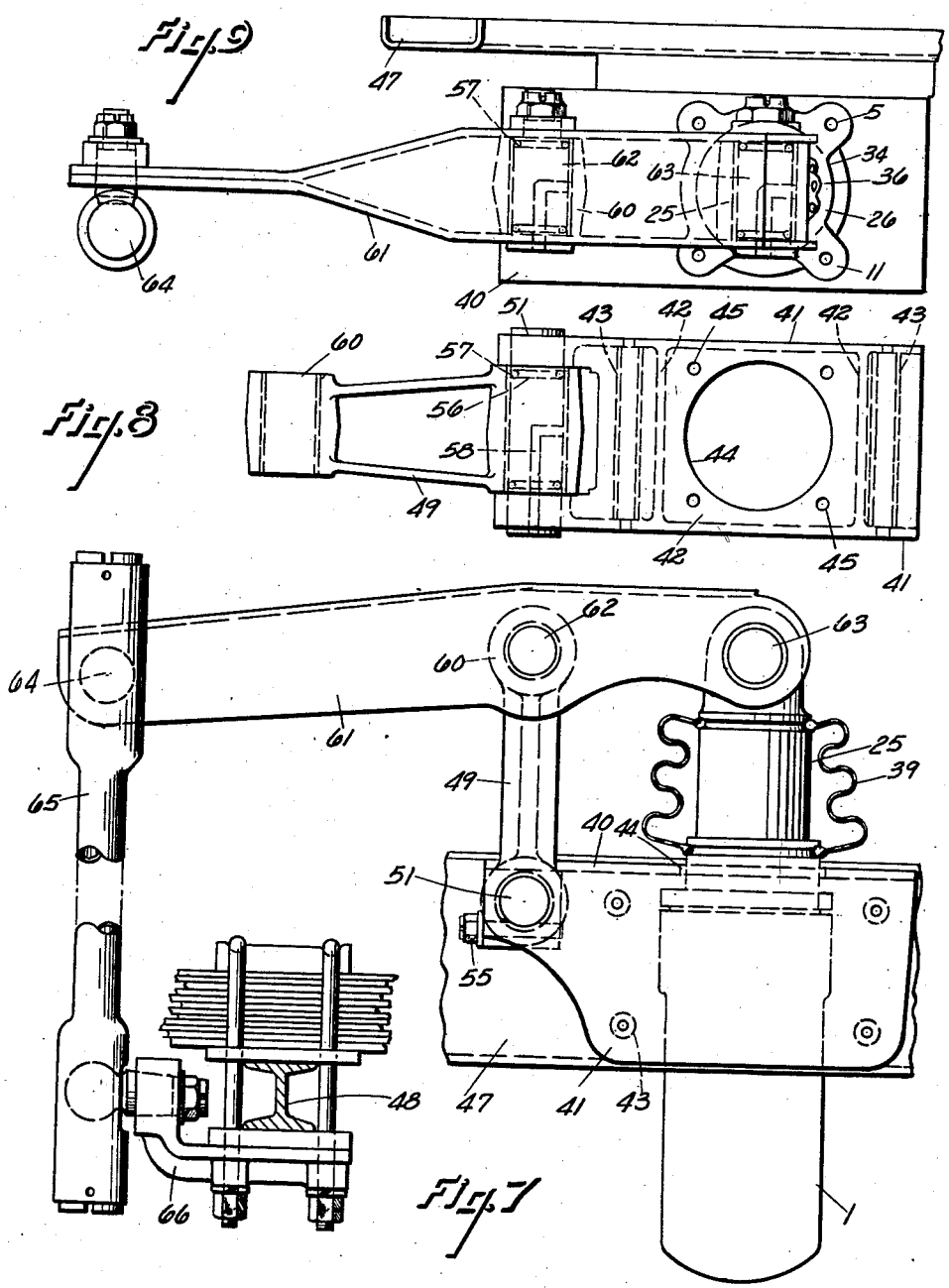

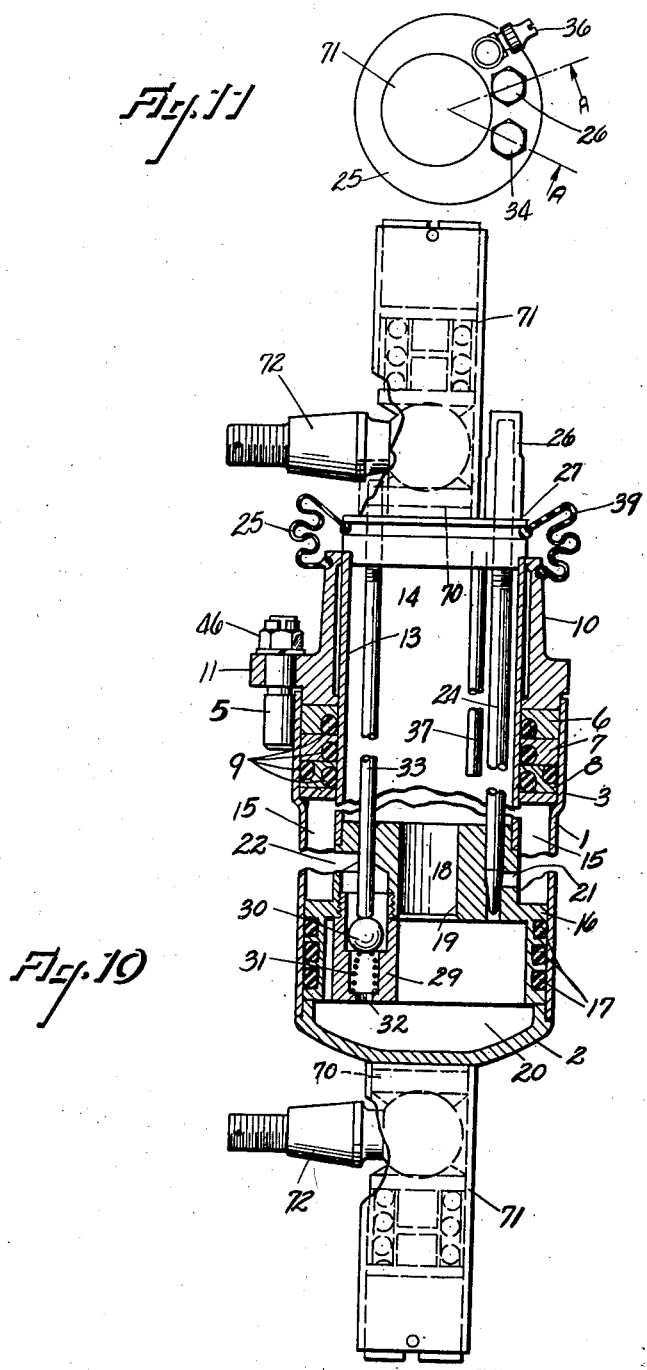

Patented Dec. 28, 1943

2,337,738

UNITED STATES PATENT OFFICE 2,337,738

DOUBLE-ACTING SHOCK BRAKE

Niels A. Christensen, South Euclid, Ohio

Application October 3, 1939, Serial No. 297,720

4 Claims. (Cl. 267—64)

This invention relates to new and useful improvements in shock brakes or shock eliminators.

An important object of the invention is to provide simple and reliable shock brakes, economical in production, readily installed and adjustable for climatic conditions and viscosity variations of its fluid working mediums, one of which is a fluid not materially affected by ordinary atmospheric temperatures.

Another object is to provide a shock brake which is readily adjustable for the travel of its piston in both directions, to provide a restrictive passage for the fluid in passing from one side of the piston to the opposite side thereof and to include an improved form of packing requiring no adjustment during its life and which requires renewal only after long periods of hard service.

Another object of the invention is to provide an improved mounting bracket for the shock brake which renders the same readily demountable and to provide a leverage for connecting the sprung and unsprung masses which will maintain its lubrication and is constructed and arranged to offer some degree of protection to the various bearings and parts against extraneous matter.

Another object of the invention is to use wrought construction fabricated of high tension material to reduce the weight of the shock brake and increase its life.

Another object of the invention is to provide a shock brake which is workable in any position and which has interchangeable parts for various types for use on automotive vehicles, airplanes, artillery recoil, and other equipment requiring a shock brake or shock eliminator.

A still further object of the invention is to provide improved valve mechanism for such shock brakes.

Other objects and advantages of the invention will become apparent during the course of the following description.

In the accompanying drawings forming a part of the application and wherein like numerals are employed to designate like parts throughout the several views, Fig. 1 is a fragmentary end elevation of the form of this invention showing the piston bearing and general arrangement of valve adjustment and filling plug.

Fig. 2 is a longitudinal section of the shock brake and mounting bracket taken on the lines 2—2 of Fig. 1.

Fig. 3 is a similar section of the piston bearing taken on the line 3—3 of Fig. 1.

Fig. 4 is a transverse section on the line 4—4 of Fig. 2.

Fig. 5 is a transverse section of a shock brake detached from the supporting bracket and is taken on the line 5—5 of Fig. 2.

Fig. 6 is a fragmentary cross section taken on the line 6—6 of Fig. 5.

Fig. 7 is a side elevation of the shock brake and lever system as applied to an automotive vehicle.

Fig. 8 is a top plan of the mounting bracket.

Fig. 9 is a top plan of the device shown in Fig. 7.

Fig. 10 is a longitudinal section of another form of the invention illustrating the direct acting type and is taken on the line A—A of Fig. 11.

Fig. 11 is a top plan of the form of invention shown in Fig. 10.

Referring now more particularly to the form of invention shown in Figs. 1, 2 and 9 inclusive, the numeral 1 designates a cylindrical casing having its lower end closed by a cap 2 and its upper end enlarged at 3 to provide an internal shoulder 4. To the exterior of this enlarged portion are welded a plurality of threaded studs 5 projecting longitudinally and well beyond the end of the casing for a purpose which will be hereinafter described.

A packing gland composed of a pair of rings 6 of L-section, one 7 of Z-section and another 8 of rectangular section are superimposed and placed as a unit inside of the enlarged end 3 of the cylinder and against the shoulder 4. The rings of L and Z sections provide inner peripheral grooves in which elastic composition packing rings 9 are seated to operate as disclosed in my U. S. Letters Patent 2,180,795, granted November 21, 1939. These metal rings 6, 7 and 8 are held clamped firmly together and against the shoulder 4 by means of a cylinder head 10 having radially projecting lugs 11 through which the studs 5 of the cylinder pass for clamping the head upon the cylinder by means of nuts 12.

A hollow piston 13 defining an inner or axial fluid chamber 14 is mounted in the cylinder 1 and slidably engages this packing gland and cylinder head. The hollow piston stem being smaller in diameter than the cylinder 1, provides an annular fluid chamber 15. Slidably mounted upon the walls of cylinder 1 is a differential piston head 16, the skirt of which is provided with a plurality of peripheral grooves to receive elastic composition packing rings 17 operating in accordance with my aforesaid patent to increase their operating life. This piston head is provided with a hub like portion 18 which fits within and is welded to the lower end of the piston sleeve 13. This hub portion is provided with an axial opening 19 for connecting the inner chamber 14 with an end chamber 20 arranged between the end of the piston head and the end closure 2. The piston head 16 is formed with two ports 21 and 22 connecting the annular space 15 with the chamber 20 at the end of the main cylinder 1. A valve seat 23 is formed in the port 21 to cooperate with the conical end of an adjusting rod 24 which extends through the piston sleeve 13 and through a solid piston head 25 welded to the upper end of piston sleeve 13. The upper exposed end of the adjusting rod 24 is screw threaded to receive a cap nut 26 provided with a copper washer 27 to form a tight joint after an adjustment of the rod has been made by turning the cap nut. This adjustment of the valve rod 24 determines the degree of restriction of the passage of liquid from the annular chamber 15 on the upward or recoil stroke of the shock brake through port 21, and also serves as a passage for liquid on the down stroke to restore the liquid to the annular chamber 15.

The other port 22 in the piston head threadedly receives a valve cage 28 provided with a valve seat 29 for a ball valve 30. A light coil spring 31 positioned in the cage 28, normally urges the ball valve 30 off of its seat. During slight pulsations of the piston 13, this ball valve remains open and liquid can pass through the port 22 but if a sudden upward piston motion takes place, due to bumps in the road, the rush of liquid will cause the ball valve to compress its spring 31 and close the passage 32 through the end of the cage. The amount of lift of the ball valve 30 from its seat is made adjustable from the exterior of the shock brake by extending a regulating rod 33 through the hub of the piston head, the piston sleeve 13 and on up through the piston head 25 closely adjacent the rod 24. The projecting end of the regulating rod 33 is screw threaded like the rod 24 and is provided with a cap nut 34 so that the rod 33 may be adjusted longitudinally to adjust the lift of the ball valve. Thus, it will be seen that the adjusting rods 24 and 33 may be readily adjusted from the exterior of the shock brake without taking the vehicle out of service.

For filling the shock brake with liquid and compressed air, the piston cap is provided with an inclined port opening out through the cap between the two cap screws 26 and 34 as best seen in Fig. 1. A valve controlled filler plug 36 is associated with the outer end of the port 35, while the inner end of the port is screw threaded to receive a filler tube 37 extending axially through the piston sleeve 13 to a point where a predetermined liquid level is to be maintained in the chambers 14 and 15.

The upper end of the piston head is provided with a bearing sleeve 38 for a purpose which will be presently described. A dust boot 39 is fastened at one end to the piston cap and at its other end to the cylinder head 10 for protection of the piston rod from road dirt.

The shock brake cylinder 1 is mounted upon the sprung mass by a U-shaped fabricated steel mounting bracket, having a horizontal top wall 40 and a pair of depending spaced parallel side walls 41 which are reinforced by a pair of transversely extending spaced apart cross bars 42 which are welded at their ends to the two vertical walls 41. These side walls are also provided with registering openings, between each pair of which, a reinforcing tube 43 is welded at its ends to the spaced side walls as shown, to provide means through which bolts, not shown, may extend to fasten the mounting bracket upon the sprung mass 47. Due to the construction of the bracket, it may be used upon either side of the vehicle.

For securely and detachably connecting the shock cylinder 1 to the mounting bracket, the upper wall of the latter is provided with an enlarged opening 44 through which projects the upper end of the cylinder head 10. Surrounding this enlarged opening are a plurality of smaller bolt openings 45 in the upper wall 40 to receive the upper threaded ends of the studs 5. Nuts 46 are threaded upon the projecting ends of the studs to rigidly clamp the shock cylinder to the wall of the bracket. The sprung mass in the particular illustration used herein for an example of the application of the shock brake, is shown at the side rail 47 of an automotive vehicle.

For connecting the shock brake to the unsprung mass of the automotive vehicle, herein shown as one of the axles 48 thereof, a fulcrum member 49 has its lower bearing end extending through a kerf or a slot 50 in the upper wall 40 of the mounting bracket and mounted upon a spindle 51. The ends of this spindle extend through the side walls 41 of the mounting bracket and through bearing blocks 52 welded to the inner surfaces of the side walls. This spindle is releasably retained in its bearings by means of the lock bolts 55 as shown in Fig. 7. The spindle 51 is provided with a pair of peripheral grooves 56, in which operate elastic packing rings 57 which bear upon the bearings in the lower end of the fulcrum 49 to seal the surfaces against the admission of dirt and to preclude leakage of lubricant furnished through the lubricating passage 58 extending longitudinally through the spindle 51 to the end thereof, where it may be provided with a suitable lubricating fitting. These packing rings 57 are disclosed in my aforesaid patent and operate with equal efficiency whether used in axially sliding contacts, or as in this instance, when they are used for oscillating movement.

The upper bearing end 60 of the fulcrum link 49 is straddled between the depending arms of a stamped lever or walking beam 61 and is mounted upon a fulcrum pin 62 fastened in lever 61 as shown. This fulcrum pin is also provided with the grooves 56 and packing rings 57 as well as the lubricating passage 58 which directs lubricant to the entire surface of the bearing 60 between the two packing rings.

The lever 61 for the greater portion of its length is of inverted channel shape to cover and protect the parts with which it is connected. One end of this lever overlaps and covers the major portion of the piston head 25 as best seen in Figs. 7 and 9 and is pivotally connected thereto by means of a pivot pin 63 similar to the pin 62. This pivot pin 63 is connected with the free end of lever 61 and extends through the bearing 38 in the piston head 25 as shown. From Fig. 9, it will be observed that the end of lever 61 does not cover the valve adjustment caps 26 and 34 or the filler plug 36 arranged between them. Thus, easy accessibility to valve adjustment is provided without removing the shock brake from service.

The other end of lever 61 is provided with a ball fitting 64 which is connected to the upper end of a link 65 which is an ordinary SAE standard steering connection used in conventional steering apparatus for automotive vehicles, and its lower end is similarly fitted to receive a ball connection 66 clamped upon the axle as illustrated only. From the foregoing it will be obvious that as the piston 16 moves inwardly in cylinder 1, the volumetric capacity of annular chamber 15 increases and that liquid from chambers 14 and 20 will flow freely upwardly into chamber 15 through passage 32, around the valve 30 held open by compression spring 31 and thence through port 22, as well as through the passages 21 and 23 at a rate depending upon the position of valve 24. Upon rebound of the vehicle axle 48, the piston 16 moves outwardly of the cylinder 1 and causes a reduction in the volumetric capacity of annular chamber 15. On small shocks, small displacement of piston 16 occurs, and the pressure in chamber 15 will not be sufficient to seat the valve 30 against the tension of spring 31. However, when the vehicle encounters more severe shocks, the piston 16 will move upwardly at increased speed, causing quicker reduction of volumetric capacity of chamber 15 and greater pressure therein to overcome the spring 31 and to force the valve 30 to close upon its seat to check the rebound according to the area of passage 23 previously adjusted by the valve 24. It will be evident, of course, that the air above the liquid level in chambers 14 and 15 will cushion the shocks by being compressed and that the restriction in the flow of liquid from the annular chamber 15 to the chambers 20 and 14 will effectively check rebounds. It will also be apparent that the rate of flow of liquid into and out of the annular chamber 15 will be regulated as desired by adjustment of the rods 24 and 33 with consequent adjustment of the amount of the clearance through ports 23 and 32.

Referring now to Figs. 10 and 11, a construction of a direct acting shock brake is illustrated which eliminates the lever linkage, but requires more head room in its mounting. Most of the parts of this form of device are the same as in the preceding form and corresponding numerals have been employed to designate corresponding parts. The piston head 25 in this instance is provided with a centering boss 70 for receiving a tubular housing 71. A similar boss and housing is provided for the other end of the shock brake. These housings are welded to their respective cylinders and piston parts and the spring plungers therein are the same as in SAE standard steering connections for receiving the ball studs 72 fastened to the two relatively movable parts which are to have their relative movements controlled. It will of course be understood that in this form of device, the use of the mounting bracket 41 is unnecessary.

It will of course be understood that various changes in the size, shape and relation of parts may be resorted to without departing from the spirit of the invention or the scope of the appended claims.

I claim:

1. A shock brake comprising a cylinder closed at both ends, a hollow piston extending through one closed end and defining an axial fluid chamber, said piston having an enlarged end operating in said cylinder and spacing the piston from the walls thereof to define an annular fluid chamber, the outer end of the piston being closed, the inner end of said hollow piston having a pair of ports connecting the annular and axial chambers, a spring pressed normally unseated floating valve in one of said ports, and adjustable valve rods extending longitudinally through the piston from the exterior thereof into said ports, one of said rods forming a needle valve with its port and the other forming a stop against which said floating valve is normally urged and held unseated.

2. A shock brake comprising a cylinder closed at both ends, a hollow piston extending through one closed end to define an axial fluid chamber and having an enlarged piston head operating in said cylinder and spacing the piston from the walls thereof to define an annular fluid chamber, the outer end of the piston having a bearing member, the enlarged piston head having a pair of ports connecting the annular and axial chambers, a spring pressed normally unseated floating valve in one of said ports, valve rods slidably mounted through the bearing member to extend into said ports, one of said rods forming a needle valve with its port and the other rod forming a stop against which said floating valve is normally urged and held unseated, and cap nuts threaded upon said rods and bearing against said bearing member for adjusting the rods.

3. A shock brake comprising a cylinder secured to the sprung mass and having a piston operating therein, a fulcrumed lever having one end connected with the piston to expose a portion of the top thereof, valved ports in the piston, and means for controlling said ports extending through the exposed portion of the top of the piston on one side of its axis to render the control means accessible for service adjustments without removal of parts.

4. A shock brake comprising a cylinder closed at one end and having a removable packed head at its other end, a hollow piston slidably mounted in said head and defining an axial fluid chamber, said piston having an enlarged end operating in said cylinder and serving to space the hollow piston from the walls of said cylinder to define an annular fluid chamber at the sides of the piston and an end fluid chamber between the enlarged end of the piston and the closed end of said cylinder, the enlarged end of said piston having a pair of ports having seats connecting the annular and end chambers, a fixed adjustment valve in one port, and a full closing automatic valve normally resiliently urged off of the seat in said other port by a force sufficient to hold said valve unseated only during initial movement of the piston in a direction which would normally cause the valve to seat.

NIELS A. CHRISTENSEN.